(12) United States Patent
Pennec

(10) Patent No.: US 11,732,678 B2
(45) Date of Patent: Aug. 22, 2023

(54) DEVICE FOR SUPPLYING FLUID TO A USER APPARATUS

(71) Applicant: L'Air Liquide, Societe Anonyme pour l'Etude et l'Exploitation des Procedes Georges Claude, Paris (FR)

(72) Inventor: Yan Pennec, Sassenage (FR)

(73) Assignee: L'Air Liquide, Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 6 days.

(21) Appl. No.: 17/590,508

(22) Filed: Feb. 1, 2022

(65) Prior Publication Data

US 2022/0243685 A1    Aug. 4, 2022

(30) Foreign Application Priority Data

Feb. 1, 2021    (FR) ...................................... 2100941

(51) Int. Cl.
*F02M 21/02*       (2006.01)
*F17C 7/04*        (2006.01)

(52) U.S. Cl.
CPC .... *F02M 21/0206* (2013.01); *F02M 21/0221* (2013.01); *F02M 21/0287* (2013.01); *F17C 7/04* (2013.01); *F17C 2221/012* (2013.01)

(58) Field of Classification Search
CPC ........... F02M 21/0206; F02M 21/0221; F02M 21/0287; F17C 7/04; F17C 9/02; F17C 2221/012; F17C 2201/056; F17C 2201/058; F17C 2203/0391; F17C 2203/0629; F17C 2205/0126; F17C 2205/0326; F17C 2205/0332; F17C 2205/0352; F17C 2223/0161; F17C 2223/033;

(Continued)

(56) References Cited

U.S. PATENT DOCUMENTS

2020/0325854 A1    10/2020    Bartlok

FOREIGN PATENT DOCUMENTS

CA    2 860 682    10/2014
FR    2 951 242    4/2011

(Continued)

OTHER PUBLICATIONS

French Search Report for FR 2 100 941, dated Sep. 18, 2021.

*Primary Examiner* — Hai H Huynh

(74) *Attorney, Agent, or Firm* — Justin K. Murray

(57) ABSTRACT

Device for supplying fluid to a user apparatus, in particular a cryogenic fuel such as hydrogen, to an engine, the device comprising a liquefied cryogenic fluid tank comprising a liquid phase and a gaseous phase, a user apparatus, a heating unit comprising a first end which is connected to the tank and a second end which is connected to the user apparatus, the drawing-off duct comprising a heater for the fluid drawn off, the device comprising a system for pressurising the tank comprising a pressurising duct comprising a first end which is connected to an upper end of the tank, a second end which is connected to a lower end of the tank, the pressurising duct comprising a fluid pumping unit and a heating unit, and being configured to draw off gaseous fluid from the tank, to heat it in the heating unit, and to re-inject this heated fluid into the low part in the liquid phase, characterised in that the pressurising duct and the drawing-off duct have a portion in common, and in that the heating unit and the heater are constituted by a single heat exchanger.

6 Claims, 1 Drawing Sheet

(58) Field of Classification Search
CPC ........ F17C 2225/0123; F17C 2225/036; F17C 2225/0161; F17C 2227/0107; F17C 2227/0309; F17C 2227/0135; F17C 2227/0302; F17C 2265/065; F17C 2260/02; F17C 2270/0168; F17C 2270/0184; Y02E 60/32; H01M 8/04007; H01M 8/04208; H01M 8/04201
USPC ............ 123/1 A, 2, 3, 27 GE, 525, 514, 557
See application file for complete search history.

(56) References Cited

FOREIGN PATENT DOCUMENTS

| | | |
|---|---|---|
| FR | 3 006 742 | 12/2014 |
| FR | 3 094 070 | 9/2020 |

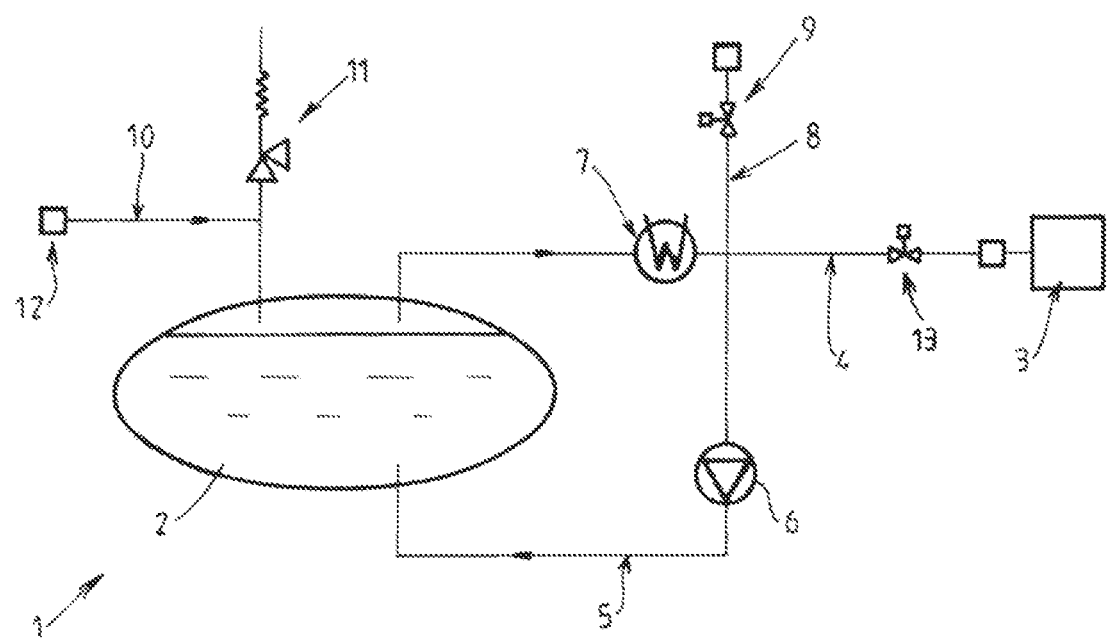

DEVICE FOR SUPPLYING FLUID TO A USER APPARATUS

CROSS-REFERENCE TO RELATED APPLICATIONS

This application claims the benefit of priority under 35 U.S.C. § 119 (a) and (b) to French patent application No. FR 2100941, filed Feb. 1, 2021, the entire contents of which are incorporated herein by reference.

BACKGROUND

Field of the Invention

The invention relates to a device for supplying fluid to a user apparatus

The invention relates more particularly to a device for supplying fluid to a user apparatus, in particular a cryogenic fuel such as hydrogen, to an engine, the device comprising a liquefied cryogenic fluid tank comprising a liquid phase and a gaseous phase, a user apparatus, a heating unit comprising a first end which is connected to the tank and a second end which is connected to the user apparatus, the drawing-off duct comprising a heater for the fluid drawn off, the device comprising a system for pressurising the tank comprising a pressurising duct comprising a first end which is connected to an upper end of the tank, a second end which is connected to a lower end of the tank, the pressurising duct comprising a fluid pumping unit and a heating unit, and being configured to draw off gaseous fluid from the tank, to heat it in the heating unit, and to re-inject this heated fluid into the low part in the liquid phase.

The invention relates in particular to an assembly comprising a container for cryogenic storage of fuel (hydrogen for example) and an engine (a fuel cell for example) of a vehicle.

Related Art

A device of this type is designed for example to make a fuel cell of a vehicle function with liquid and/or gaseous hydrogen.

The incorporation of devices of this type in vehicles requires optimisation in view of the constraints of safety, cost and mass (in particular for airborne vehicles).

SUMMARY OF THE INVENTION

An objective of the present invention is to overcome all or some of the drawbacks of the prior art identified above.

For this purpose, the device according to the invention, which is moreover in conformity with the generic definition given by the above preamble, is substantially characterised in that the pressurising duct and the drawing-off duct have a portion in common, and in that the heating unit and the heater are constituted by a single heat exchanger.

Furthermore, embodiments of the invention may comprise one or more of the following characteristics:
- the device comprises a filling duct, comprising a first end which is designed to be connected to a source of fluid, and a second end which is connected to the tank;
- the filling duct is distinct from the drawing-off duct and from the pressurising duct, it comprises only a shutter of the rapid connection type at its first end, and is without another isolation valve between its two ends;
- the device comprises a degassing duct comprising an end which is connected to the upper end of the tank, and a second end which is connected to a discharge area, the degassing duct comprising a valve(s) assembly which is configured to control the discharge of excess pressure to the exterior of the tank;
- the degassing duct comprises a portion in common with the drawing-off duct.

The invention can also relate to any alternative device or method comprising any combination of the characteristics above or below within the scope of the claims.

BRIEF DESCRIPTION OF THE FIGURES

Other distinctive features and advantages will become apparent on reading the description below, given with reference to:

The single FIGURE represents a schematic and partial view illustrating an example of a structure and of functioning of a device according to the invention.

DETAILED DESCRIPTION OF THE INVENTION

The device 1 for supplying fluid comprises a liquefied cryogenic fluid (typically hydrogen) tank 2 comprising a liquid phase (in the lower part) and a gaseous phase (in the upper part). The device 1 comprises a user apparatus 3, such as a fuel cell, or any other engine.

The tank 2 is preferably a cryogenic storage tank, for example with double walls and insulated under vacuum.

The device 1 comprises a heating unit 7 comprising a first end which is connected to the tank 2 (preferably in the gaseous part, but which can also function as a variant or in combination with liquid drawing off), and a second end which is connected to the user apparatus 3 for the purpose of supply thereof with fuel fluid.

The drawing-off duct 4 comprises a heater 7 for the fluid drawn off, for example in order to heat the fluid from a cryogenic temperature to a non-cryogenic temperature, for example between $-100°$ C. and $+60°$ C. As represented, the drawing-off duct 4 preferably has a valve 13 or shutter.

The device 1 also comprises a system for pressurising the tank 2 comprising a pressurising duct 5. This pressurising duct 5 comprises a first end which is connected to an upper end of the tank 2 (in order to collect gas) and a second end which is preferably connected to a lower end of the tank 2. The pressurising duct 5 comprises a unit 6 for circulation of fluid (fan, pump, compressor, or any other appropriate unit), and a heating unit 7. This makes it possible to draw off gaseous fluid from the tank, and to heat it in the heating unit 7 in order to re-inject it into the low part in the liquid phase, so as to increase the pressure in the tank to a determined value (for example in order to permit drawing off by means of simple pressure differential).

According to an advantageous feature, the pressurising duct 5 and the drawing-off duct 4 have a portion in common, and the heating unit and the heater are constituted by a single heat exchanger 7

Thus, the drawing off to supply an engine or to pressurise the tank 2 can use a single pipe which is connected to the top of the tank 2. Thus, in most of the common operations, the gas alone can be extracted. This permits perfect conformity with all the arbitrary conditions of mobility (inclination, vibrations, turbulence, etc.) of the vehicle which comprises this device 1.

One exchanger 7 (a single one for example) can be provided for these two functions, i.e. to heat the gas to ambient temperature or to pressurise the tank 2.

Preferably, this unit is outside the tank 2, and is connected by means of an insulated double-wall line. The heat exchanger can be accommodated in a dedicated vacuum chamber, the main function of which is to ensure safety in the event of breakdown/leakage of the unit.

This architecture, which is simpler than the known systems with two distinct systems, makes it possible nevertheless to control the pressure. In fact, the heating power required, which can be extremely high (from 10 kW to 100 kW depending on the size of the tank), is possible (in particular when all of the fuel must be heated to the saturation temperature of the service pressure).

Contrary to the binary systems advocated in the prior art, the present solution makes it possible to comply with the constraints.

The tank 2 can be pressurised by direct injection of hot gas into the tank 2. A small quantity of hot gas can convey a large quantity of heat at approximately 4 kJ/g. The heat can be diffused efficiently in the liquid thanks to the injectors with diffused bubbles. The power can easily be regulated by varying the mass flow rate (for example via the unit 6). This unit 6 can be a small compact supply unit, since it does not need a high head pressure, generally of 100 mBar.

The device 1 uses the same heat exchanger 7 for pressurising and for conveying fuel. These two functions can be used in turn without having a negative effect on the dynamics of injection of fuel into the engine 3.

The device also comprises a degassing duct 8 comprising an end which is connected to the upper end of the tank 2, and a second end which is connected to a discharge area, the degassing duct 8 comprising a valve(s) assembly 9 which is configured to discharge excess pressure to the exterior of the tank 2. This degassing duct 8 preferably comprises a portion in common with the drawing-off duct 4 (connection to the tank 2 for example).

The device 1 comprises a preferably distinct filling duct 10, which has a first end designed to be connected to a source of fluid, and a second end connected to the tank 2 (for example in the upper part).

The duct preferably comprises only one shutter 12 of the rapid connection type at its first end, and is thus without another insulation valve between its two ends. This provides altogether advantageous simplification of the device 1 by lowering the production cost, improving the gravity index, and increasing the reliability.

The filling duct 10 can comprise for example only a single closure component, for example a connection of the "Johnston" type associated with a cryogenic stop valve. It will be appreciated that this could be replaced by a single rapid self-closing connection.

This simplification permits filling during which the transfer of under-cooled fluid generates little or no gas. Even if vaporisation gas were generated during filling, alternating sequences of filling/depressurisation could be envisaged in the interior of the single port. This depressurisation can be carried out via the degassing duct 8 and a valve 9 which is preferably not cryogenically insulated (downstream from the heat exchanger 7). This permits simple extraction of the excess pressure or fuel.

This makes it possible to dispense with the valve boxes advocated in the known solutions.

Thus, only two cryogenic valves (or a single one or none) can be necessary for the filling, which valves can be incorporated directly on the outer structure of the tank 2.

The tank 2 is protected against excess pressure by a supplementary excess pressure valve 11 on the filling line (and which can be duplicated if necessary).

All the piping of the device 1 can be connected directly to a safety unit (without valves which may be defective).

The heat exchanger 7 can be accommodated in a dedicated vacuum unit in order not to contaminate the vacuum of the main tank 2 in the event of a defect.

The transfer to the fuel cell 3 can be stopped either by an ambient valve situated after the fuel heat exchanger 7, or by depressurisation of the tank 2.

The heat exchanger 7 for supplying fuel can be distant, and connected to a double-wall line with an arbitrary length.

The pumping unit 6 can be connected at a distance to a double-wall line with an arbitrary length. The safety unit can be connected at a distance to double-wall lines with a length which is preferably shorter than 2 m, in order to limit the oversizing of the lines. Each sub-system can be produced separately, thus limiting the needs for complex integration, and providing a large degree of freedom to adapt to the constraints.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context dearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a ramie is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. A device for supplying a cryogenic fuel to a user apparatus, the device comprising:

a liquefied cryogenic fluid tank comprising a liquid phase and a gaseous phase of the cryogenic fuel;

a user apparatus;

a heating unit comprising a first end which is connected to the tank and a second end which is connected to the user apparatus;

a drawing-off duct comprising a heater for cryogenic fuel drawn off of the drawing-off duct, and a system for pressurizing the tank comprising a pressurising duct comprising a first end which is connected to an upper end of the tank and a second end which is connected to a lower end of the tank, the pressurizing duct comprising a fluid pumping unit and a heating unit, the pressurizing duct being configured to draw off gaseous phase cryogenic fuel from the tank, heat the drawn off cryogenic fuel in the heating unit, and to re-inject the heated drawn off cryogenic fuel into the liquid phase in the liquefied cryogenic fluid tank, wherein the pressurizing duct and the drawing-off duct have a portion in common to one another and the heating unit and the heater are constituted by a single heat exchanger.

2. The device of claim 1, further comprising a filling duct that comprises a first end that is designed to be connected to a source of fluid and a second end that is connected to the tank.

3. The device of claim 2, wherein the filling duct is distinct from the drawing-off duct and from the pressurizing duct, the filling duct includes only one shutter of the rapid connection type at the first end of the filling duct and is without another isolation valve between first and second ends thereof.

4. The device of claim 1, further comprising a degassing duct comprising an end that is connected to the upper end of the tank and a second end that is connected to a discharge area, the degassing duct comprising a valve(s) assembly which is configured to control discharge of excess pressure to an exterior of the tank.

5. The device of claim 4, wherein the degassing duct comprises a portion in common with the drawing-off duct.

6. The device of claim 1, wherein the cryogenic fuel is hydrogen and the user apparatus is an engine.

\* \* \* \* \*